July 9, 1957 P. S. DENNING 2,798,674
FILTER AID AND ITS PREPARATION
Filed Jan. 7, 1953 2 Sheets-Sheet 1

INVENTOR
PAUL S. DENNING,

BY

ATTORNEY

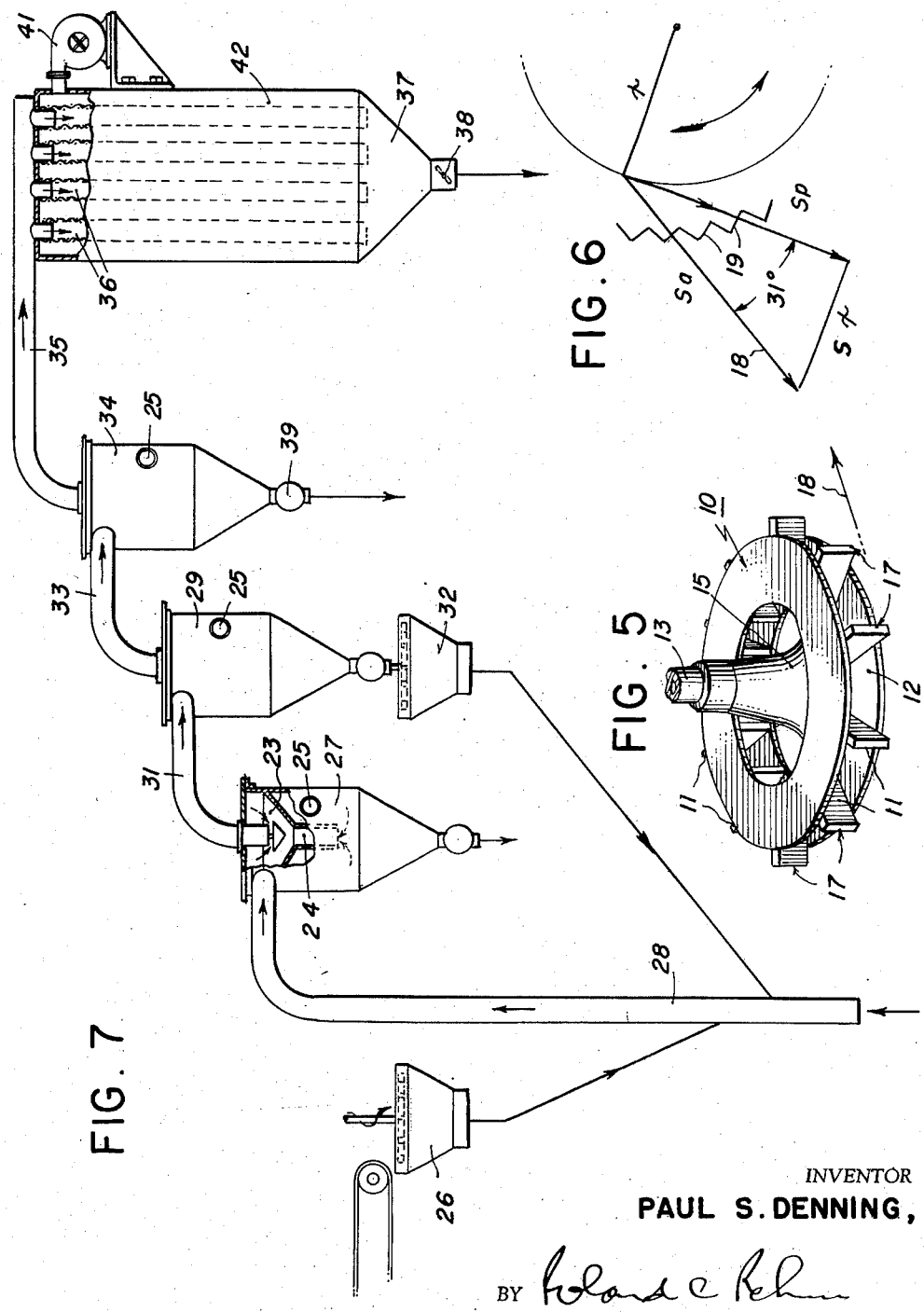

United States Patent Office 2,798,674
Patented July 9, 1957

2,798,674
FILTER AID AND ITS PREPARATION

Paul S. Denning, Joliet, Ill., assignor to F. E. Schundler & Co., Inc., Joliet, Ill., a corporation of Illinois Application January 7, 1953, Serial No. 330,053

2 Claims. (Cl. 241—5)

This invention relates to filter aids.

Filter aids of the present type are finely divided solids (generally inert minerals) of such particle size and shape as to form a filter bed or cake of such porosity and permeability as to permit fairly free passage of liquids without passing any of the solids to be removed from the liquid. The present filter aid is formed from expanded perlite comminuted to filter aid sizes.

The nature of the invention and further details thereof will readily appear from the following description of one illustrative product and its method of preparation. Details of the method are illustrated in the accompanying drawings, wherein:

Fig. 5 is a perspective view of the impeller;

Fig. 6 is a diagram illustrating the operation of the impact comminuter; and

Fig. 7 is a diagram in the form of a flow sheet illustrating one method of comminuting and classifying the expanded perlite.

Figure 1:
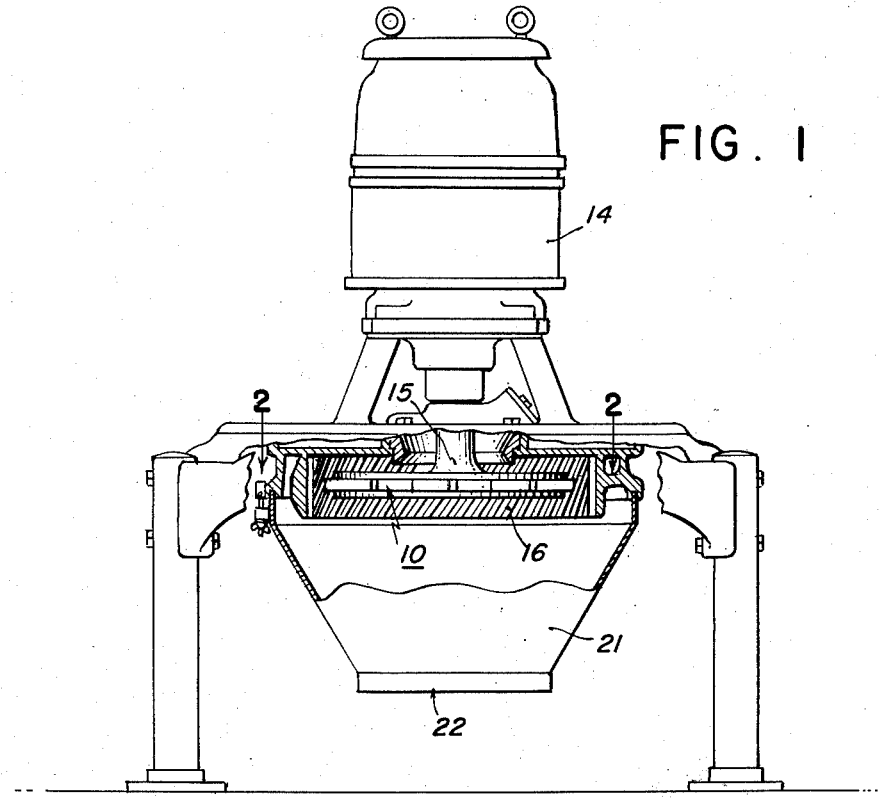
Fig. 1 is an elevation, partly in section, of one form of comminuting apparatus.
Figure 2:
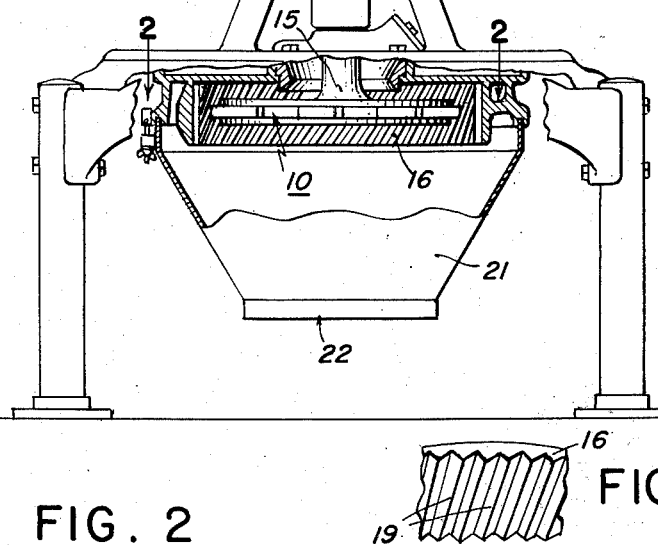
Fig. 2 is a section on the plane 2—2 of Fig. 1, showing an impeller and impact element.
Figure 3:
Fig. 3 is an enlarged fragmentary perspective of the impact element.

The function of a filter aid of the type here involved is to maintain the porosity and permeability of a filter, to increase the rate of flow, and to assist in clarifying the liquid. High flow rate through the filter coupled with high clarity of the filtrate requires close control over size and shape of the filter aid particle.

Heretofore comminuted diatomaceous earth has been the standard filter aid of the type here involved. Diatomaceous earth filter aids are, however, expensive and not always uniform in properties due to the wide variation in diatom structure. While it has been suggested that expanded perlite be used as a filter aid, it has not been possible, heretofore, to devise a satisfactory method of producing a uniform and efficient product.

Perlite is a type of volcanic glass containing small amounts of substances which cause the particles or granules of the perlite ore to soften at relatively low temperatures (e. g. 1400° F. to about 2000° F., depending on the type of perlite) and to expand under the internal pressures of steam and gases to many times their original size. In general the expanded perlite granule is analogous to solid foam, comprising a plurality of minute bubbles enclosed by very thin glass walls. The smaller expanded perlite particles tend to assume spherical shape, and microscopic expanded granules may indeed comprise hollow spheres. Under some expanding conditions and types of perlite, the perlite granules pop or shatter, resulting in very light and fragile particles. Shattering or popping is generally achieved by exposing the particles of perlite ore to expanding temperatures without preheating, thereby subjecting the particles to maximum expanding forces when the perlite glass is softened to produce maximum expansion and therefore maximum attenuation of the glass walls surrounding the pores in the expanded particle. The resulting particle is therefore very light and its walls very fragile.

In general the suitability of comminuted expanded perlite to serve as a filter aid depends on limiting the amount of ultra fine particles which would clog or prematurely clog the filter bed or cake to a minimum, and on minimizing the amount of expanded perlite with such heavy or strong walls that they cannot be comminuted to filter aid size by the comminuting apparatus without producing an excessive amount of ultra fines. Of course, excessively large particles should be held to a minimum because they reduce the effective area of the filter bed and tend to make "open" spots in the bed which permit the passage of solids. Little difficulty is encountered in minimizing the large or heavy particles, but, ultra fines are difficult to eliminate and also represent waste since there is little demand for them as a by-product. Particle sizes larger than 200 mesh contribute little or nothing to filtration. In the case of clarifying a sugar solution, for example, ultra fines should be regarded as particles smaller than 2 microns, of which not more than 4% should be present for a satisfactory flow rate. Presence of a greater amount of ultra fines in such a case reduces the efficiency of the filter by cutting down the filter rate to an inefficient figure. What is regarded as ultra fines depends somewhat on the minimum size of the particle to be filtered out of the liquid. When the particle is unusually minute (as where enzymes are filtered from beer) the ultra fines may be smaller than need be permitted when the solids to be filtered out are larger. In the case of such extremely small particles, the filter rate is necessarily much slower than when the minimum size of the solids to be filtered out are larger. It is often the practice to filter a liquid twice, the first filtration removing large solids, and the second filtration through possibly a finer filter cake, to remove the minute particles which cause turbidity, to secure clarification. For complex filtering problems accurate control of the range of sizes of the filter aid particles is important and such range of sizes should preferably be from 3 to 10 microns.

In this connection it should be understood that a filter aid of this type is generally added to the liquid to be filtered and builds up a filter bed or cake on the cloth in the filter press of such depth and permeability that the fine solids filtered out do not clog the filter. To condition the filter for operation, it is generally the practice to employ a pre-coating operation which comprises passing through the filter water in which is suspended about one-tenth of a pound of filter aid material per square foot of filter surface. When the water has passed through leaving the filter aid in place in the filter cake, the filter should immediately produce clarity in the liquid to be filtered. If pre-coating is not resorted to, a quantity of liquid to be filtered must be passed through the filter before clarity of filtrate is achieved. Before flow is reduced to an unsatisfactory figure (by accumulation of filtered solids in the cake) additional filter aid is added to maintain porosity and permeability of the filter cake. The depth to which a filter cake may thus be built up without reduction of the flow to an unsatisfactory figure while maintaining brilliance of filtrate, is another measure of the efficiency of the filter aid. Ultra fines, of course, will cut down the efficiency in this respect, by accumulating in the filter bed until the flow rate is objectionably reduced.

For liquids similar to sugar solutions in viscosity and particle size to be removed to achieve the desired clarity, the effective filter aid particle size may vary from about 2 to 40 microns. Maximum efficiency in clarity and filter rate is obtained by filter aid particles of substantially uniform size or a close range of sizes.

Some conception of the shape of the filter aid particles may be obtained by an understanding of the nature of the particles of expanded perlite from which the filter aid is made. Such expanded particles should weigh not substantially more than 4 pounds per cubic foot and preferably much less. The particles should preferably be so fragile that they may be readily crushed between the thumb and finger. Many of the very light weight particles are fragments resulting when the particle is expanded so greatly that the pore walls rupture. Such material weighs about 1 to 2 pounds per cubic foot and is characterized by a feathery nature having such an extremely high angle of repose that even though very dry, it will not pour or flow readily. Heavier particles are generally spherical but may comprise a cluster of minute pores. The internal structure of the expanded granules resembles solid foam, comprising a multitude of minute polyhedral pores or bubbles of fairly uniform size, separated by glass walls of extreme thinness. When granules of the character above described are shattered, the facets or faces of the polyhedron enclosing the pore walls will break at their weakest point, that is between the angles of the walls, to form either spiculated particles or particles comprising fragments of two or more facets joined at an angle. Such particles do not present large flat faces which might "felt" together to form an impervious filter cake, but build up in an "open" or permeable structure wherein the passages are so small that substantially all solids will be filtered out.

Many types of expanding furnace tend to expose the particles of ore for a uniform period regardless of the ore particle size, thereby overexposing the smaller particles and underexposing the larger particles. This is characteristic of the rotating retort type of furnace, for example. An overexposed particle is maintained too long in softened or partly fused condition with the result that it shrinks in size and the pore walls become thickened and too strong to be regarded as fragile. The underexposed or larger particles do not expand to maximum size and the pore walls are also too thick and strong to produce a sufficiently fragile particle. The suitability of various ore sizes depends therefore to some extent on the type of expanding furnace used. If a furnace can expand all ore particles to the maximum regardless of size, a 200 mesh ore would produce as acceptable an expanded perlite as a 65 mesh ore. In the ordinary furnaces in which minus 325 mesh ore does not pass through sufficiently rapidly to avoid over treatment, the expanded product from such ore does not weigh less than 5½ to 6 pounds per cubic foot, whereas minus 50 to plus 100 mesh ore will expand to 1½ to 1¾ pounds per cubic foot.

For the common types of expanding furnaces it is therefore desirable to grade the ore to limit the range of particle sizes. Preferably the ore should be graded to minus 50 plus 200 mesh. If all the very fine dust (e. g. minus 325 mesh) could be eliminated, an ore size of minus 50 mesh would be suitable, but it is commercially impracticable to eliminate the fine dust once it has been formed unless the same be passed through a classifier as presently explained.

Various types of expanding furnaces may be used in expanding the perlite. One type of furnace is the rotary tubular furnace slightly inclined towards the discharge end and heated by a burner or burners discharging into the upper end of the tubular retort with such gas velocity as to carry the perlite introduced at the upper end of the retort down the retort as the perlite is expanded. The retort is preferably rotated to maintain all parts of the retort wall at uniform temperatures and particularly to prevent overheating of any part. Rotation also carries rock and any heavy unexpanded particles to the discharge end. For one illustrative type of ore the expansion temperature is about 1800° F. This temperature applies to the expanding temperature of the perlite ore particle itself and not to the flame temperatures which of course are substantially higher than the expansion temperature of the ore. The expanding characteristics of perlite for most of the known sources in the United States are well known. These vary with the perlite, and if the perlite be susceptible of expansion to the proper bulk densities, those skilled in the art can adjust the screen analysis of the ore and the expanding temperatures (and if preheating be advantageous, the preheating conditions) to produce an expanded particle of an acceptable density. I have found that more uniform ore sizes can be obtained from a ball mill. Where iron contamination would be a problem, the mill should be porcelain lined and the balls porcelain. The material is fed through the mill at a relatively rapid rate to reduce the amount of minus 325 mesh material. After grinding the ore may advantageously be passed through a classifier of the type presently described, to remove as much as possible of the minus 325 ore. After classification as aforesaid, an illustrative ore screen analysis is:

|  | Percent |
| --- | --- |
| Plus 50 mesh | .5 |
| Plus 100 mesh | 48.44 |
| Plus 200 mesh | 38.85 |
| Plus 325 mesh | 10.6 |
| Minus 325 mesh | 1.5 |

The expanded perlite is then comminuted to produce a maximum proportion of particles within the filter aid range of sizes. I have discovered that this may be accomplished and the amount of ultra fines (which tend to clog the filter and slow down the filter rate) minimized, by comminuting the expanded perlite by impact of the particles (not against each other as in the conventional attrition mill) but with a solid surface. This result is obtained by giving the particles of expanded perlite a given velocity, generally in the same direction (to minimize collision of the particles with each other) and permitting them to strike a solid surface. I have further discovered that the force required to subdivide a particle of the aforesaid expanded perlite to the filter aid range of sizes, varies approximately as the kinetic energy of the particle at a predetermined velocity (which is a function of the masses of the respective particles), and for that reason the particles are given generally uniform predetermined velocities (in generally parallel directions) and caused to strike against a solid surface to be shattered by their respective impacts. The forces of impact of the respective particles against such solid surface, varies with the mass of the particle and is sufficient to subdivide the particles to the filter aid range of sizes. When and if the particle reaches the filter aid range of sizes its kinetic energy at the aforesaid velocity, is insufficient substantially further to shatter the particle on impact.

Figure 4:
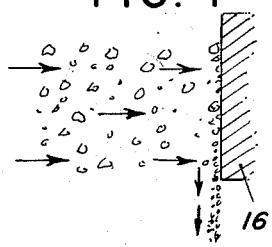
Fig. 4 is a diagram illustrating the method of comminuting the expanded perlite.

The particular method of giving the particles the desired velocity may be varied, but substantial collision of granules with each other should be avoided because such collision forces have no necessary relation to the mass of the particles, being haphazard in character and therefore unpredictable and uncontrollable. This also applies to incidental impacts of the granules under forces other than the impact with the aforesaid solid surface resulting from the aforesaid velocity given the particles. Fig. 4 is a diagram on a greatly enlarged scale illustrating comminution of the particles by impact under predetermined and uniform velocity in generally parallel direction. As there shown particles of expanded perlite of varying masses but uniform velocity, shatter to filter aid sizes having a limited size range.

The aforegoing method of comminution should be employed with perlite granules of the aforesaid limited range of bulk densities. Particles of greater bulk density will have too much kinetic energy and therefore the higher resulting shattering force will cause excessive sub-division and result in production of an excessive porportion of ultra fines. Impurities such as rock and unexpanded or imperfectly expanded perlite should preferably be removed from the expanded perlite before it is subjected to comminution. This can be readily done as presented explained because of the wide differences in bulk density between the particles of expanded perlite and the heavy impurities.

Comminution by the impact method illustrated in Fig. 4 can be effected in a variety of ways, such as by an air stream which carries the particles toward a solid surface at a velocity to give them adequate kinetic energy, or, as preferred, by a rotary impeller which discharges the particles at uniform velocity by centrifugal force against the solid surface with the desired kinetic energy. An impeller device for producing the desired velocity is preferable to one employing an air stream because the latter on striking the solid surface is deflected and tends to deflect the very light weight particles and thereby to interfere with efficient impact with the solid surface. One such impeller device is illustrated in Figs. 1–6.

In general the impact comminuting apparatus is characterized by a rotating impeller 10 having a plurality of radial blades 11 and a bottom 12 which closes the impeller against escape of the perlite except radially as presently explained. The impeller is mounted for rotation (preferably in a horizontal plane) on a shaft 13 driven by a motor or other prime mover enclosed in housing 14. Expanded perlite is fed to the impeller from above near its center and is given radial velocity by the impeller blades. Preferably the blades are omitted adjacent the center of the impeller so as not to strike the granules of perlite as they enter the impeller. As here shown the granules strike the curved or filleted surface 15 of the bottom 12 by which they are gradually directed outwardly and enter the spaces between the impeller blades 11. An annular plate or cover preferably encloses the tops of the spaces between the impeller blades. The latter rotate the granules, and the centrifugal force generated by such rotation throws the granules outwardly and discharges them from the periphery of the impeller against the solid surface 16 at a velocity corresponding to the tangential velocity of the tips 17 of the impeller blades. The direction of travel of the granules as they leave the impeller (indicated by line 18—see Fig. 5) is the resultant of their tangential and radial velocities. The solid impact surface which the granules strike is here shown in the form of a stationary ring surrounding the impeller and opposite its discharge periphery. Preferably the ring is provided with a plurality of facets 19 generally normal to the aforesaid direction of travel to insure maximum utilization of the kinetic energy to subdivide the granules on impact.

After being subdivided by striking the solid surface, the comminuted particles fall into a collecting hopper 21 from which they are discharged through the opening 22 in the bottom for further processing.

Travel of the granules through the impeller and impact with the solid surface, is characterized by minimum of collision of the particles with each other because adjacent particels travel generally in the same direction and at the same velocity. Substantial collision forces (which might cause fracturing of the granules) are practically absent, and substantially the sole comminuting forces are the impacts of the several granules against the aforesaid solid surface and such forces vary in accordancce with the force necessary to subdivide the respective particles into filter aid size.

Once the impeller has been adjusted for a given expanded perlite to give the particles the velocity which produces comminution within the desired range of sizes, uniform results can be expected so long as the expanded perlite remains substantially uniform. This is demonstrated by the circumstance that if the comminuted perlite be passed through the impeller the second time little further subdivision occurs in particles of filter aid size and smaller, since the comminuted particles are of such low mass that insufficient kinetic energy can be given them by the impeller to cause further subdivision. In general the adjustment of the impact comminuter is such that when the comminuted product is recycled that portion of it larger than filter aid size (e. g. larger than approximately 40 microns), will be subdivided until it reaches filter aid size. Thus the production of ultra fines is minimized.

Adequate impact forces may be obtained with tangential impeller velocities of the order of 500 feet per second (obtained, for example, with a 27 inch impeller rotating at 3500 R. P. M.). Preferably the prime mover for rotating the impeller is provided with speed varying means to permit adjustment of impeller speed to increase or decrease the impact forces to secure the maximum production of filter aid sizes and minimize the amount of oversize without producing excessive ultra fines. Somewhat similar results may be obtained by passing the material through the impact comminuter more than once. Either all the material may be passed through more than once or only the oversize material. A plurality of passes of material already of filter aid size does not, for the reasons given above, cause further substantial subdivision of material already of filter aid size.

It is of course impossible to expand every particle so that it will fall within the desired range of bulk densities. A small percentage of heavier particles is inevitable, since it is impossible by any practical means to grind the ore so that all of it falls within the optimum size range. The ore will inevitably contain small amounts of ore granules which are too large as well as too small. The larger grains of ore (outside the size range) can be recycled to advantage through the impact comminuter since their respective masses are still great enough to produce further subdivision. While granules of expanded perlite heavier than desired tend to produce some ultra fines because of the high impact forces resulting from their greater mass, I have found that the addition of some ultra fines is not sufficient to justify discarding the heavier particles instead of recycling them through the impact comminuters.

After initial comminution of the perlite as aforesaid, the product is classified into (1) partly expanded perlite, (2) expanded perlite to be recycled, being capable of comminution to filter aid range of sizes, (3) the filter aid product, and (4) ultra fines. I have found that the aforesaid classification may be effected by an efficient cyclone type of centrifugal classifier provided with means for introducing adjustable and controlled disturbance (in the form of a counter-rotating air current) which effects a separation from the balance of the solids of a variable light weight fraction thereof. A classifier of this type is illustrated in Fig. 7 and further details are shown in United States Patent 2,236,548. Essentially, the aforesaid classifier comprises upper and lower cylindrical chambers divided by a cone shaped hopper discharging from the upper chamber into the lower (Fig. 7). The solids are carried tangentially by the carrying air current into the upper chamber where they whirl in a clockwise direction and are thrown out against the chamber wall by centrifugal force and travel spirally down the conical hopper 23 to a center outlet spout 24. A regulated counter-current of so called disturbing air is introduced tangentially (to rotate counterclockwise) into the lower chamber through a tangential port controlled by an adjustable air valve 25. The disturbing air whirling in a direction opposite that of the solids-carrying air stream in the upper chamber and enters the latter through outlet 24, meeting the layer of solids as they fall through the outlet. Depending upon the adjustment of the valve, the stream of counter-whirling disturbing air picks up a limited size range of the smaller particles of solids and carries them upward and out of the classifier for further treatment as next described. The maximum size of the fraction carried away is thus controlled by the setting of the valve 25 which controls the admission of disturbing air.

Fig. 7 is a diagram of one illustrative flow sheet, but it should be understood that the sequence of the comminuting and classifying steps may be considerably varied if desired as presently explained. Expanded perlite of the proper bulk density is delivered by conveying means to an impact comminuter 26 of the type above described (Figs. 1-6), the discharge from which is delivered to classifier 27. Preferably a preliminary separation of rock and other heavy particles is made before reaching the classifier, by discharging the comminuted material into the upwardly traveling air current in conduit 28 leading to classifier 27. The material such as rock and other heavy impurities too heavy to be levitated by the air current falls out of the open lower end of conduit 28, thus relieving the classifier of erosion and wear incident to introduction of such heavy impurities. The balance of the material including a small amount of partly expanded perlite and heavier particles of expanded perlite is carried into the classifier and introduced tangentially therein by conduit 28 to travel in a clockwise spiral in the upper chamber of the classifier. The valve 25 controlling admission of the disturbing air is adjusted to effect separation between the expanded comminuted perlite and the aforesaid heavy expanded or partly expanded perlite, discharging the latter to the dump or for use as a by-product and delivering the comminuted expanded perlite to a classifier 29 similar to classifier 27, through conduit 31. The latter classifier is adjusted to effect separation between the comminuted perlite of filter aid and smaller size, and the heavier particles of comminuted expanded perlite larger than the filter aid range of sizes, capable of further subdivision on recycling, the latter particles being returned for further comminution in an impact comminuter of the type described above. In the present instance the latter material is preferably passed through a second impact comminuter 32 similar to the first, to relieve the load on the first. The discharge from the second comminuter is recycled through classifier 27 along with that from comminuter 26, preferably by feeding it into conduit 28 from which any heavy particles of rock and other impurities which may have accidentally been entrained, may fall out of the lower end of conduit 28. The product of filter aid size and smaller is delivered through conduit 33 from classifier 29 to a third classifier 34 similar to classifiers 27 and 29, the valve 25 of which is adjusted to separate out ultra fines and deliver the latter via conduit 35 to a separator and collector here shown in the form of a so-called stocking dust collector (comprising tubes 36 of fine mesh fabric which screen out the ultra fines). The latter are collected in the hopper 37 into which the stockings discharge and from which the ultra fines may be withdrawn through valve 38. The balance of the material in classifier 34, being the product of filter aid size, is collected in the conical classifier hopper and discharged through valve 39 for bagging or storing.

One illustrative filter aid thus produced and suitable for removal of extremely fine particles such as those removed in final filtration for polishing of beer, wine or other low viscosity filtrates, has the following sub-sieve analysis:

| | |
|---|---|
| 40-30 microns | nil |
| 30-20 microns | 4.5 |
| 20-10 microns | 25.5 |
| 10- 5 microns | 55.0 |
| 5- 4 microns | 2.5 |
| 3- 2 microns | 1 |
| Less than 2 microns | nil |

The aforesaid system may operate either by positive air pressure delivered through conduit 28 or, as here shown by suction, wherein a suction fan 41 is connected to the space inside housing 42 but outside the stockings. Suction is transmitted through the mesh of the stockings to conduit 35 and thence to the successive classifiers, air entering the system through conduit 28.

Under some conditions it may be desirable to pass the material in succession through two impact comminuters 26 and 32, for example, without intervening passage through a classifier. Such a sequence of steps might be advantageous in the event the expanded perlite contains little impurities or unexpanded material and particularly if a substantial portion of the expanded perlite be of such character that it is not comminuted sufficiently finely by one passage through a comminuter. Recycling may be effected either by passage through successive comminuters or return of the product for recycling through the same comminuter. The number of comminuters used generally depends upon the capacity of each and whether recycling in a single comminuter overloads it. Overloading might interfere with the comminuting action.

Obviously the invention is not limited to the details of the illustrative product or its method of manufacture since these may be variously modified. Moreover it is not indispensible that all features of the invention be used conjointly since various features may be used to advantage in different combinations and subcombinations.

Having described by invention I claim:

1. The method of comminuting expanded perlite to filter aid size with a minimum amount of ultra fines which comprises flowing onto a rotating impeller having radial vanes expanded perlite particles weighing four (4) pounds per cubic foot and being fragile enough to be crushed between thumb and finger, rotating said impeller to a tangential velocity of the order of 500 ft. per second to impart radial centrifugal velocity to said particles, impinging said particles against a hard surface as they leave said impeller, the velocity imparted to said particles by said impeller giving said particles a kinetic energy sufficient to fracture them on impact with said surface to a size range of minus 200 mesh and plus 2 microns but being insufficient to cause fracture of particles smaller than 2 microns, separating from the comminuted particles those particles larger than the aforesaid size range and re-cycling the same until they have been reduced to said size range, the kinetic energy imparted by said impeller to particles of 2 microns and smaller being insufficient to cause further fracture thereof.

2. The method of comminuting expanded perlite to filter aid size with a minimum amount of ultra fines which comprises flowing onto a rotating impeller having radial vanes expanded perlite particles weighing four (4) pounds per cubic foot and being fragile enough to be crushed between thumb and finger, rotating said impeller to a tangential velocity of the order of 500 ft. per second to impart radial centrifugal velocity to said particles, impinging said particles against a hard surface as they leave said impeller, the velocity imparted to said particles by said impeller giving particles larger than 2 microns sufficient kinetic energy to fracture the same on impact with said surface to a size range of minus 200 mesh to 2 microns, separating oversize particles from the comminuted product and re-cycling the same until they have been reduced to a size range small than 200 mesh, the kinetic energy imparted to particles of 2 microns and smaller being insufficient to cause further fracture of said particles.

References Cited in the file of this patent

UNITED STATES PATENTS

| | | |
|---|---|---|
| 1,484,208 | Davis | Feb. 19, 1924 |
| 1,608,717 | Bell | Nov. 30, 1926 |
| 2,352,327 | Kirn | June 27, 1944 |
| 2,474,314 | Koehne | June 28, 1949 |
| 2,602,782 | Zoradi | July 8, 1952 |
| 2,651,470 | Dodds | Sept. 8, 1953 |

FOREIGN PATENTS

| | | |
|---|---|---|
| 394,478 | Great Britain | June 29, 1933 |

OTHER REFERENCES

"New Insulating Material," article in Compressed Air Magazine, vol. 47 (1942), page 6694.